United States Patent
Blumentritt et al.

(10) Patent No.: US 6,292,333 B1
(45) Date of Patent: *Sep. 18, 2001

(54) DISK DRIVE HAVING AN I.D. RAMP LOADING SYSTEM EMPLOYING MULTIPLE-FUNCTION SPACER STRUCTURE

(75) Inventors: Bruce F. Blumentritt, Rochester; He Huang, Eden Prairie; Sidney Y. Xue, Rochester, all of MN (US)

(73) Assignee: Western Digital Technologies, Inc., Lake Forest, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,923

(22) Filed: Feb. 11, 1999

(51) Int. Cl.$^7$ .......................................... G11B 5/54
(52) U.S. Cl. ........................................ 360/254.8; 360/255
(58) Field of Search .................. 360/105, 254.7, 360/254.8, 255

(56) References Cited

U.S. PATENT DOCUMENTS

| | | |
|---|---|---|
| 5,574,604 | 11/1996 | Berg et al. . |
| 5,585,980 * | 12/1996 | Boutaghou .................... 360/254.8 |
| 5,625,514 * | 4/1997 | Kubo et al. ................... 360/104 |
| 5,644,451 * | 7/1997 | Chan et al. .................... 360/105 |
| 5,701,219 | 12/1997 | Shafe' . |
| 6,181,529 * | 1/2001 | Aoyagi et al. ................ 360/255 |

\* cited by examiner

*Primary Examiner*—Robert S. Tupper
(74) *Attorney, Agent, or Firm*—Won Tae C Kim; Milad G Shara (57) ABSTRACT

Disk spacers in multiple disk drives are shaped to provide a reliable mechanism for loading and unloading magnetic recording heads and a reliable latch when the heads are unloaded. The head load/unload system operates between a stack of latch-profiled spacer ramps sandwiching magnetic hard disks and a stack of lifting arms with contoured tips attached to head/suspension assemblies. The lifting arms and their contoured tips are built as part of the one-piece of the suspension load beams at their inner diameter side perpendicular to the load beam axis, or at their front along the axis. The spacer ramps are precisely machined to a latch profile with a desired rounded edge merging with the disk surface, an inclined slope, a round hump and a rounded recess, so that the contoured tip of a lifting arm can slide onto the slope first, over the hump and then into the recess where the tip is latched. The spacer ramps also serve either in a couple as the separator of any two adjacent disks, or individually as the separator between the top disk clamp and the top surface of the top disk and between the bottom base and the bottom disk. The spacer ramps are self-calibrated vertically with the disk stack. Both coated with diamond like carbon or other hard coatings, the profiled spacer ramps, also coated with lubricants after a hard coating, and contoured tips are reliable in ramp wear control. A single sided limiter from the suspension load beam reduces the torsion to the head flexure tang generated by the lifting force at an inner side lifting arm when the head is unloaded from the disk.

14 Claims, 6 Drawing Sheets

DISK DRIVE HAVING AN I.D. RAMP LOADING SYSTEM EMPLOYING MULTIPLE-FUNCTION SPACER STRUCTURE

BACKGROUND OF THE INVENTION

In general, this invention relates to hard disk drive technology; more particularly, it relates to a drive having an inner diameter ("I.D.") ramp loading system that employs multiple-function spacer structure.

An important issue that arises in designing a hard disk drive relates to head parking which involves placing a head stack assembly in an appropriate position while there is no power applied to the drive. Generally, some type of head parking is needed to avoid problems that result if a spinup operation is initiated while a head contacts any part of a disk surface that defines a data recording zone. In accordance with some designs, each recording surface has a landing zone at which the head for that recording surface is parked. In accordance with other designs, a ramp loading system is provided. Some ramp loading systems are categorized as outer diameter ("O.D.") systems and others as I.D. systems. With either an O.D. system or an I.D. system, the head-position control system that controls the angular position of the head stack assembly performs a parking operation to unload the heads before completion of spindown, and performs a loading operation immediately after at least substantial completion of spinup. With an O.D. system, the unloading occurs adjacent the O.D. With an I.D. system, the unloading occurs adjacent the I.D. and can involve multiple phases including a seek phase at full spin rate followed by an unloading phase starting at a reduced spin rate and completed when the spin motor stops spinning.

For additional background regarding prior art I.D. ramp loading systems, see U.S. Pat. No. 5,644,451 to Chan et al., U.S. Pat. No. 5,574,604 to Berg et al., and U.S. Pat. No. 5,701,219 to Shafe.

The teachings of the prior art regarding I.D. ramp loading systems leave unresolved various significant technical difficulties with respect to designing a practical system for a high capacity, high performance, high rpm disk drive. In such a drive employing multiple disks in a disk stack, a tight three-way merge tolerance is demanded not only between the disk stack and the head stack, but also between the head stack and the ramp stack, as well as the ramp stack and the disk stack. The z-height variance of a ramp stack itself has to be minimized, while all the ramps have to be precisely machined to a sophisticated ramp profile, made from a thermally stable and wear resistant materials. The disk flutter at OD is a function of spin rate; thus, higher rpm drives have greater such disk flutter; this further stresses a tight head/disk merge for any OD load/unload system. This, coupled with dramatically increasing linear velocity at OD poses severe risk for loading/unloading a head onto a disk. In addition, a given range of the disk surface at OD has to be allocated to loading/unloading, which becomes a significant loss to the premium real estate for data recording.

Other technical difficulties arise in I.D. ramp loading systems designed in accordance with the prior art such as the teachings of the patents referred to above. There exists a significant need to overcoming such difficulties with a low cost approach appropriate for mass production of cost competitive drives. Lastly, it has not proven practical to add effective shrouding around the O.D. of the disk pack, and shrouding is critically important to minimizing motor power consumption, air turbulence and disk flutter in high performance disk drives with an extremely high track following requirement.

SUMMARY OF THE INVENTION

This invention can be regarded as a disk drive having ramp-loading means. The drive comprises a disk having a disk spin axis and recording surface for storing data; a head for reading data from the recording surface; a spindle motor having a rotor; and clamping means for clamping the disk so that the disk spins with the rotor.

Significantly, the drive includes a multiple-function spacer means forming part of the clamping means and forming part of the ramp-loading means. The ramp-loading means includes a lift tab having protuberance projecting away from the lift tab toward the recording surface such that the protuberance defines a protuberance depth. The spacer means has a spacer spin axis and an axially-symmetrical surface. The spacer spin axis is aligned with the disk spin axis and the axially-symmetrical surface faces away from the recording surface. The axially-symmetrical surface defines, in radial cross section, a sloped section and a recessed section adjoining the sloped section, the recessed section defining a recess depth, the recess depth not exceeding the protuberance depth. The drive also includes head-position control means for controlling a parking operation carried out while the disk and the spacer means are spinning and in which the protuberance rises adjacent the sloped section and comes to rest in the recessed section. In one embodiment, the spacer means comprises an integral structure having parallel spaced-apart surfaces that are under compression within the clamping means. In another embodiment, the spacer means comprises multi-piece structure compressed between a pair of disks, the multi-piece structure including a ring having bearing surfaces and a pair of elements having facing contoured surfaces.

An embodiment of the invention can eliminate the three-way Z-height calibration required for an OD load/unload ramp and the disk array. With head loading/unloading being performed at inner circular rings of the disk surface, less premium for data recording and reserved as the loading/unloading buffer zone but normally occupied by the landing zone texture. Preferably, head load/unload lifters, made as part of the whole head suspension pieces, all have a contoured tip, specially designed and coated with wear resistant hard coating. The heads are unloaded from the disk surfaces while those half spherical tips slide onto the outer edge ramps of disk spacers, and then are latched into the recesses behind the ramps. The heads are loaded onto the disk surfaces while the actuator arm drives the half spherical tips outwards from the recesses, down along the ramps approaching the disk surfaces, keeping rotating both the disks and their spacers. The spacer ramp profiles will self adjust in Z-height to the disk array which then needs only one, not three, Z-height merge adjustment with the head stack. The clearance and tolerance requirement between a ramp and disk surface with an OD ramp drive system is then removed, allowing smaller disk spacing and tighter Z-height control, since the ramp here is attached to the disk surface at ID. The circular load/unload spacers with ramps can be machined from more thermally and mechanically stable materials like aluminum or stainless steel, and then coated with a hard, wearing resisting coating such as diamond like carbon, and then lubricant. If necessary, aluminum or stainless steel is electrically plated with Ni—P coating and polished before being further coated with wear resistant coating. The rotating spacer ramps underneath the lifting contoured tips help create an air bearing force which pushes up the sliding protuberances away from the spacer ramps and therefore, reduces the interference. If any contact does occur, wear can be minimized with the wear resistant hard coatings on both the spacer ramps and the half spherical tips.

BRIEF DESCRIPTION OF THE DRAWINGS

FIG. 1A is cross section of a portion of a disk drive that, in accordance with a side-lifting embodiment of the invention, has a side-cantilevered lift tab; FIG. 1A shows among other things a radially-extending cross section of an axially-symmetrical surface that defines a sloped section and a recessed section.

DETAILED DESCRIPTION OF THE PREFERRED EMBODIMENTS

Figure 1A:
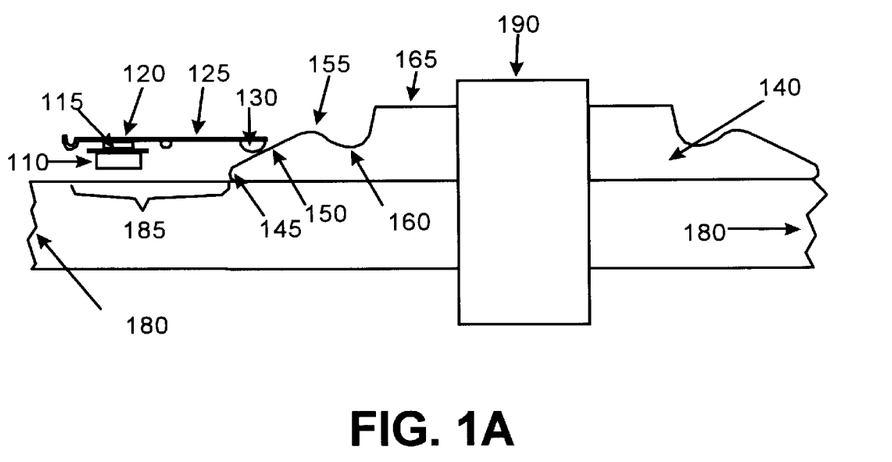
Figure 1B:
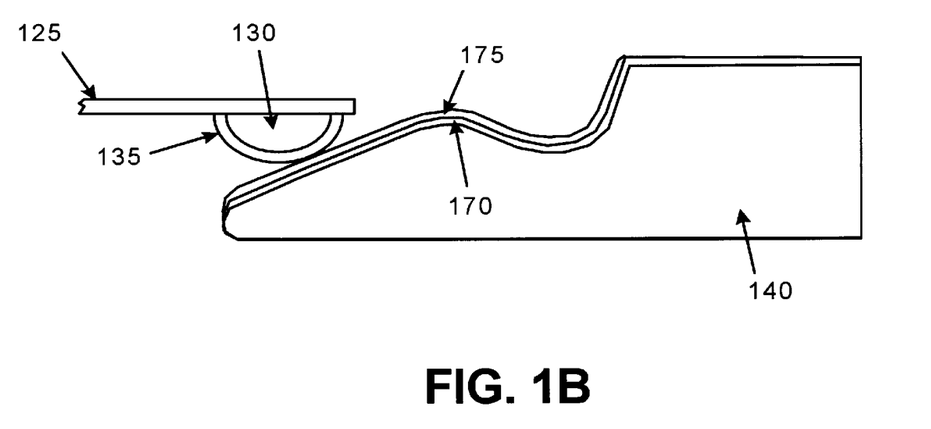
FIG. 1B an enlarged view of a portion of FIG. 1A.

With reference to FIG. 1A, a hard disk drive embodying the invention includes, for each recording surface, a head gimbal assembly that includes a head 110, a structure interchangeably referred to as a flexure or gimbal 115, and a load beam 120. Load beam 120 includes a lift tab 125 that extends perpendicularly from the longitudinal axis of the head gimbal assembly. Lift tab 125 has a protuberance 130. As indicated in FIG. 1B, protuberance 130 preferably includes a wear-resisting coating 135 of wear-resistant material such as diamond like carbon.

Figure 2:
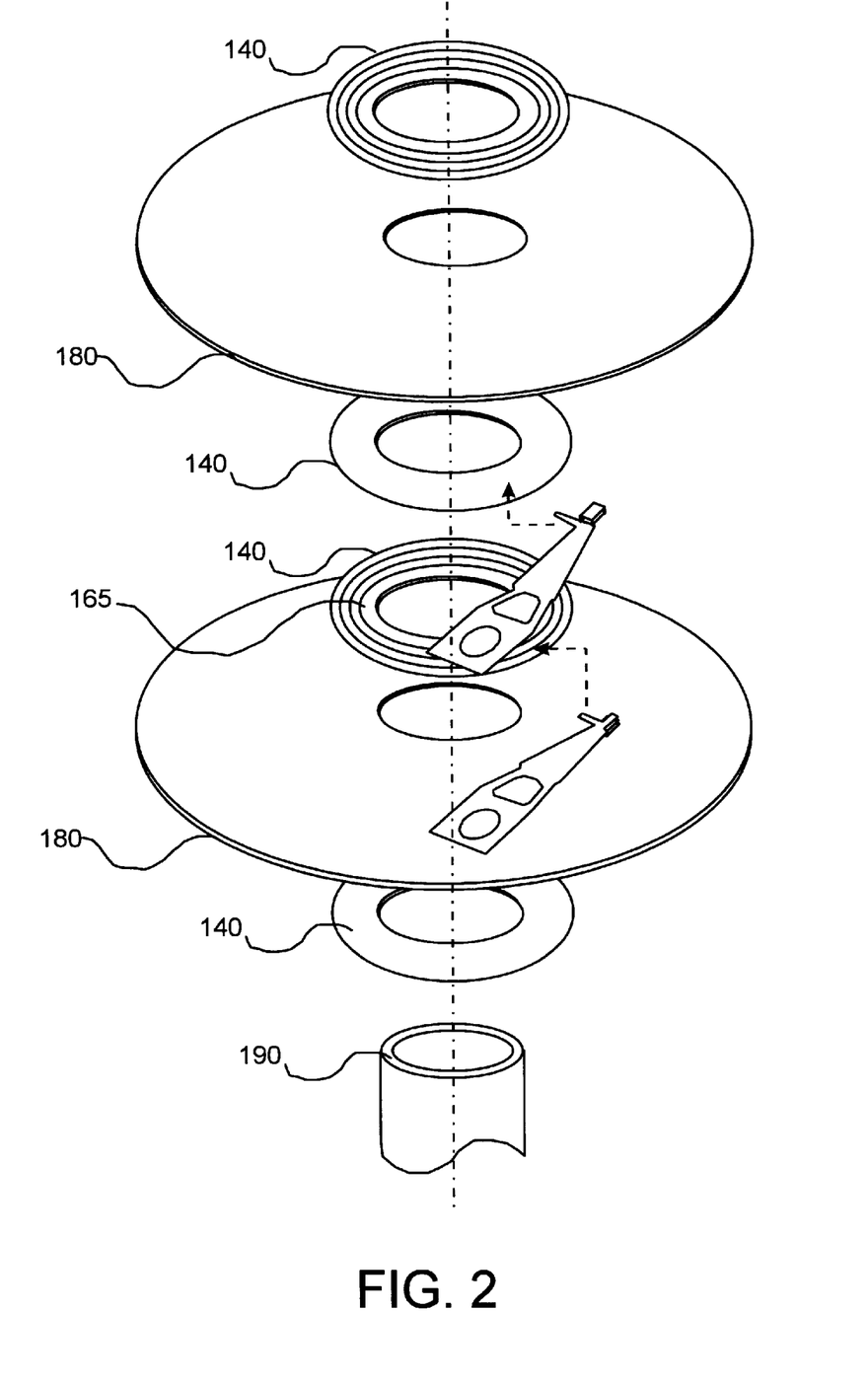
FIG. 2 is an exploded view of the side-lifting embodiment of the disk drive and shows multiple disks and spacers that form part of the clamping means and part of the ramp loading means.

The drive includes a multiple-function means such as spacer 140 that as explained in more detail below forms part of a clamping means and part of a ramp loading means. Spacer 140 is an individually integral structure having parallel spaced-apart surfaces that are under compression within the clamping means, and includes a rounded peripheral edge 145, and in radial cross section defines a sloped section 150, a rounded hump 155, a recessed section 160, and a plateau section 165. As indicated in FIG. 2B, spacer 140 preferably includes a wear-resisting coating 170 of wear-resistant material such as diamond like carbon, and a lubricant layer 175.

Figure 4:
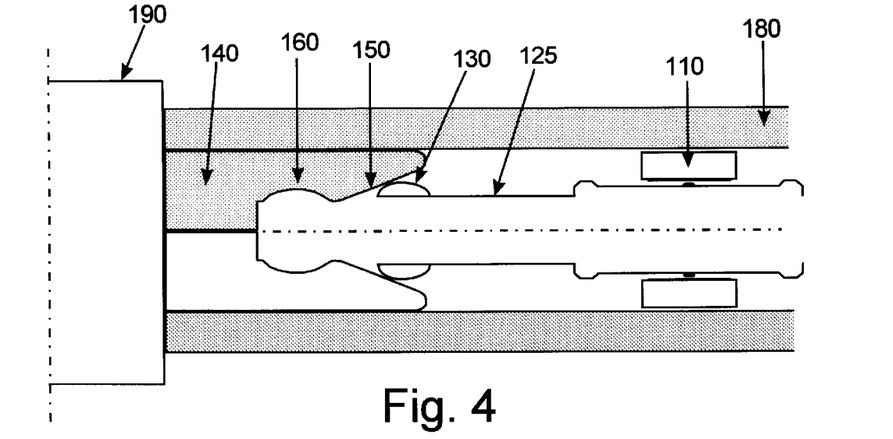
FIG. 4 is a side view of structure comprising a pair of recording disks, and a pair of individually integral spacer elements, and a pair of head gimbal assemblies with each protuberance abutting a corresponding ramp.
Figure 5:
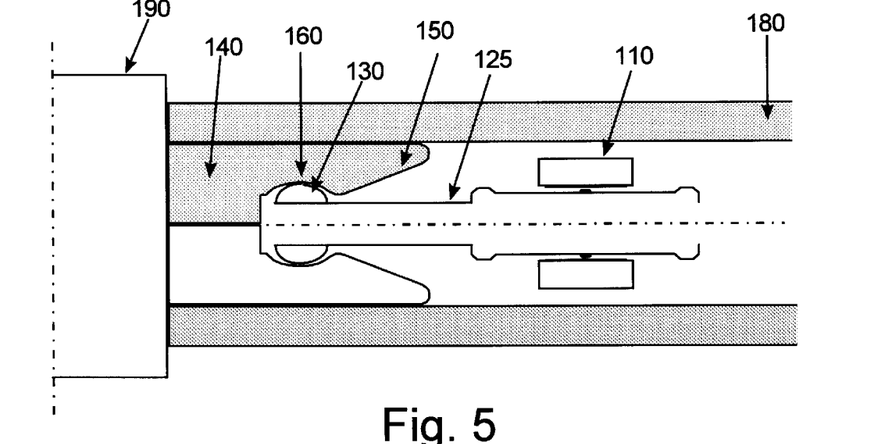
FIG. 5 is a side view of structure comprising a pair of recording disks, and a pair of individually integral spacer elements, and a pair of head gimbal assemblies with each protuberance retained in a corresponding recess.
Figure 6:
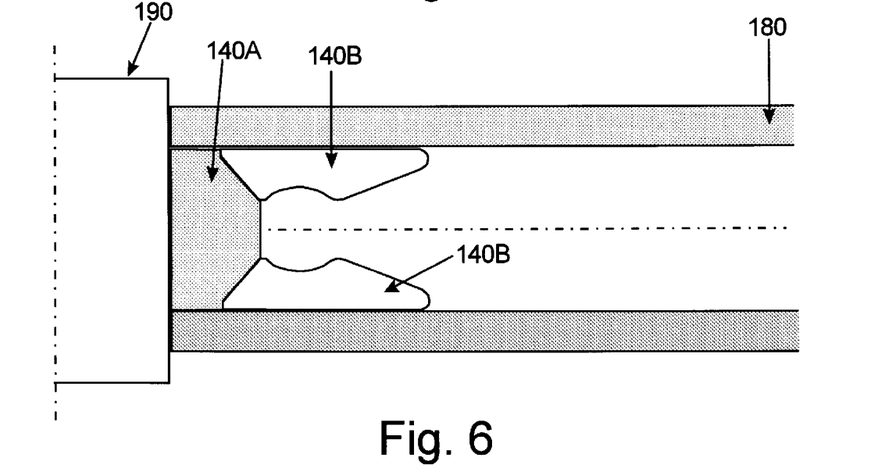
FIG. 6 is a side view of structure for an alternative embodiment of the invention in which the structure includes a pair of recording disks, and a multi-piece embodiment of spacer means.

The drive includes a disk 180 having a loading zone 185, and a spindle motor having a rotor 190; the disk has a disk spin axis coaxially aligned with the spin axis defined by rotor 190. As indicated in each of FIGS. 4 and 5, in a multi-disk drive, a pair of spacers 140 are under compression within the clamping means. In an alternative embodiment as shown in FIG. 6, the spacer means comprises a multi-piece structure including a ring 140A having bearing surfaces each oriented such that in cross section an angle is defined between an outer circumferential surface and a respective one of disk facing surfaces. The multi-piece structure also includes a pair of elements 140B having facing contoured surfaces.

Figure 1C:
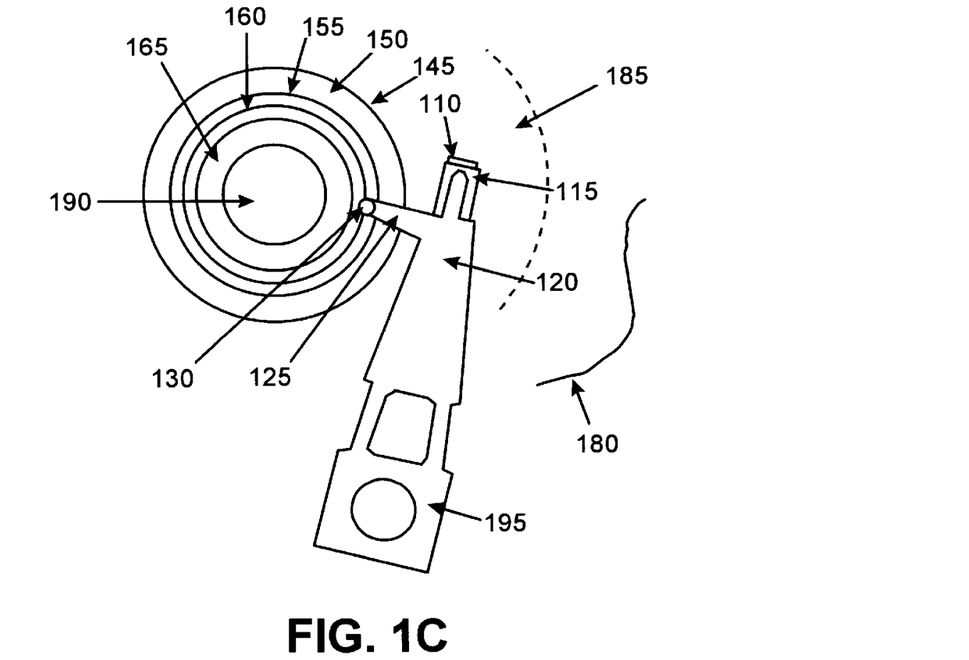
FIG. 1C a top view of a portion of the side-lifting embodiment with the head stack positioned at its latched position at which a protuberance overlies the recessed section of the axially-symmetrical surface.

With reference to FIG. 1C, load beam 120 is shown as extending from a pivot bearing assembly 195 that forms part of the head-position control means for controlling head positioning operations including a head parking operation.

Figure 1D:
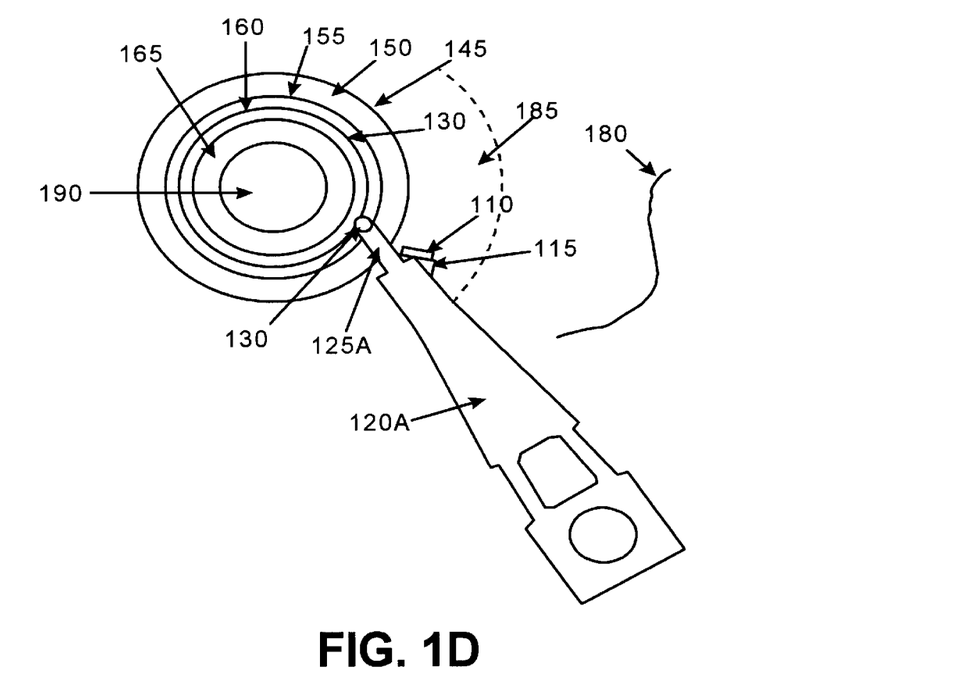
FIG. 1D a top view of a portion of an alternative embodiment involving front lifting, and shows the head stack assembly positioned at its latched position at which a protuberance overlies the recessed section of the axially-symmetrical surface.

With reference to FIG. 1D, an alternative load beam 120A is shown as extending from the pivot bearing assembly 195. Alternative load beam 120A has its lifting tab 125 extending in alignment with the longitudinal axis of the load beam to provide for front loading.

With reference to the exploded view of FIG. 2, the vertical dashed line represents the spin axis about which the following elements spin in unison because they are clamped together: rotor 190, a first spacer 140, a first disk 180, a second spacer 140, a third spacer 140, a second disk 180 and a fourth spacer 140. Second spacer 140 has its flat surface facing downwardly such that it seats flush against the upper surface of the first disk. Third spacer 140 has its flat surface facing upwardly such that it seats flush against the lower surface of the second disk. The profiled surfaces of the second and third spacers face each other.

FIG. 2 also shows portions of the head stack assembly. One such portion is a first head gimbal assembly that includes a downwardly facing head for writing data to and reading data from the upper recording surface of the first disk. Another such portion is a second head gimbal assembly that includes an upwardly facing head for writing data to and reading data from the lower recording surface of the second disk.

Figure 3A:
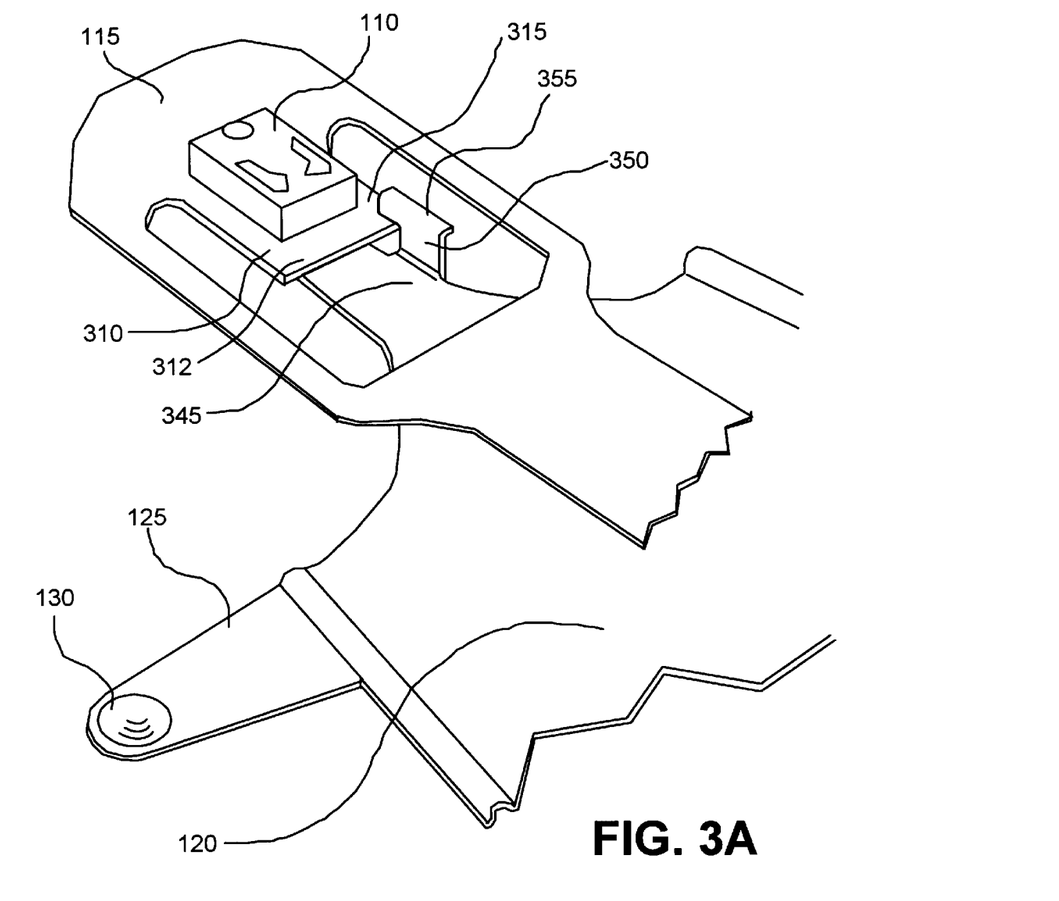
FIG. 3A is a perspective view of a portion of a head gimbal assembly that includes a lift tab having a protuberance.

With reference to FIG. 3A, load beam 120 includes a load beam tip 345 that extends along its longitudinal axis away so as to be positioned near head 110. Load beam tip 345 includes a single sided limiter 350 that has a bent edge 355. Limiter 350 projects away from the major plane of load beam 120 in a direction such that as installed in the drive it points toward the recording surface. Flexure 115 includes a tang 312 having an inner side 310 and an outer side 315. The tang 312 has head 110 affixed to it. The tang projects into a cutout in flexure 115 such that a portion of outer side 315 can cooperate with limiter 350 to provide a stop.

Figure 3B:
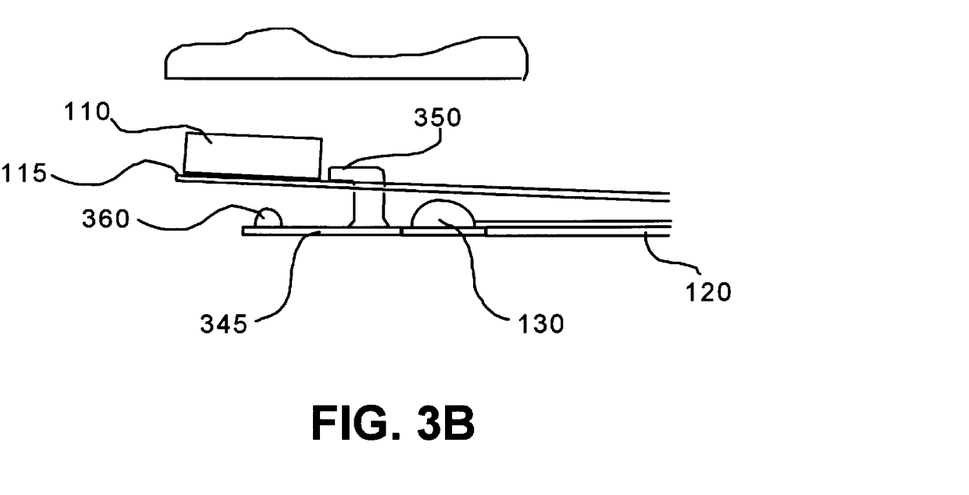
FIG. 3B a side view of structure defining an asymmetric lifting mechanism.

With reference to FIG. 3B, load beam tip 345 has a dimple 360 at its distal end. Single sided limiter 350 can limit the uplift bending of outer side 315 of flexure tang 312 beyond the clearance when head 110 is pulled away from dimple 360 at load beam tip 345.

When a lifting force is applied at protuberance 130, torsion is created to twist flexure tang 310. The direction of this torsion, with reference to FIG. 3A, is in accord with a left-hand rule with the thumb pointing from the pivot bearing assembly toward head 110, such that protuberance 130 moves away from its adjacent disk surface while load beam tip 345 is lifted and the outer side 315 of the flexure tang moves toward the adjacent disk surface. The asymmetric setting of single sided limiter 350 only at outer side 315 of the flexure tang provides the flexure tang and head 110 with a counter balancing torsion so that head 110 is lifted at both outer and inner sides.

With respect to operation, the disk drive has a normal mode of operation, and starting and ending modes of operation. During its normal mode of operation, the disk drive responds to commands from a host to write data to and reading data from and tracks in the data zones of the recording surfaces. During the normal mode, the spindle motor causes the stack of disks 180 to rotate at a normal read/write spin rate and each head 110 flies adjacent a respective recording surface. During the ending mode of operation, prior to spinning down the spindle motor, the head positioning servo system swings the head stack assembly toward the I.D. Each head 110 in the head stack assembly is unloaded by lifting up each head 110 away from a dedicated loading zone while each disk 180 continues to rotate at such a spin rate that each head 110 flies and does not intermittently have contact disk contact. During the starting mode of operation, after spinning up the spindle motor, the head positioning servo system swings the head stack assembly away from the I.D. Thus, each head 110 is unloaded and kept away from the stack of disks before and after the stack of disks stop rotating, which avoids stiction force and prevents collisions between head and disk. While the stack of disks is still rotating, the head positioning system loads each head 110 upon moving above dedicated loading zone 185.

Loading zone 185 is an inner, annular portion of disk 180. As a design variable, the outer radius of landing zone 185 is subject to change. It is suitable to select a relatively small outer radius such that data are not stored in loading zone 185 because its outermost radius is too small for efficient data storage. If alternatively the outermost radius of loading zone 185 is sufficiently large that it would otherwise be practical to store user data in loading zone 185, it is nevertheless undesirable to do so. Contact if any between head 110 and loading zone 185 does not cause damage to user data since there are no user data stored in loading zone 185. In contrast to user data, it is reasonable to store track-identifying data in loading zone 185 to help the head positioning system to load and unload the stack of heads 110.

With respect to the loading and unloading operations, when an actuator moves head 110 towards the center of disk 180, protuberance 130 first engages (see FIG. 4), then slides along ramp slope 150 and moves up to hump 155 and then settles at recess 160 (see FIG. 5) before disk 180 gradually spins down to stop. During this whole process of unloading, lift tab 125 lifts load beam 120, which pulls head 110 away from disk 180 at loading zone 185 and settles head 110 a distance away from the surface of disk 180 after protuberance 130 slides into and parks at recess 160. Recess 160 and protuberance 130 latch each other while disk 180 dwells. In normal operation, with the disks and spacer 140 both spinning above a certain speed, a sufficient airbearing force is developed underneath protuberance 130 so that protuberance 130 flies while sliding above the ramp-profile of spacer 140. A head loading process starts as disk 180 and spacer 140 start to spin to reach a certain speed so that a sufficient airbearing force is built up and protuberance 130 can fly while sliding away from recess 160, over hump 155, and down to ramp slope 150 while head 110 approaches and flies the surface of loading zone 185 at a desired fly height.

The interface where a relative sliding occur consists of protuberance 130 of lift tab 120, and the ramp profile of spacer 140 as shown in FIG. 1B. Preferably, protuberance 130 is fabricated via sheet metal forming to half-sphere into a die cast, polished, surface treated and then coated with a tip wear-resisting coating 135 of wear-resistant materials like diamond like carbon. Spacer 140, with such a ramp profile made from metallic materials like stainless steel, is precision-machined, polished, surface treated, and then coated with a spacer wear-resisting coating 170 and spacer lubricant 175 on the surface of the ramp profile covering at least ramp slope 150, hump 155, and recess 160. Above the ramp profile of spacer 140, protuberance 130 flies, supported by air-bearing force pushing upward, above spacer 140 so that intermit contact between spacer 140 and protuberance 130 and interfacial wear are minimized.

As for the side lifting configuration illustrated by FIG. 1C, lift tab 125 is fabricated as part of load beam 120 in one piece at inner radius side, nearly vertical to the central line of load beam 120 and pointing towards motor axis 190. Flexure 115 has its front attached to load beam 120, and head 110 is attached to flexure 115, preferably by spot welding, with both aligned with the central axis of load beam 120. Driven by actuator, protuberance 130 slides first onto ramp slope 150, over hump 155, and then into recess 160 where it is latched and stops outside flat plateau 165 when head 110 is unload from disk 180 at loading zone 185.

As for the front lifting configuration illustrated by FIG. 1D, lifting arm 125 is fabricated as part of load beam 120 in one piece from the front, along the central line of load beam 120 and pointing towards motor axis 190. Flexure 115 has its front attached to load beam 120 with a skew angle, and head 110 parallel attached to flexure 115, so that head 110 is aligned with the circumference of disk 180 in a sufficiently small skew angle at loading zone 185. Driven by actuator, protuberance 130 slides first onto ramp slope 150, over hump 155, and then into recess 160 where it is latched and stop outside flat plateau 165 when head 110 is being unloaded from disk 180 at loading zone 185.

As for the assembly of the drive illustrated in FIG. 2, two circular disk spacers 140 with the two profiled ramps opposite to each other but merging at their flat plateaus 165, are constrained axially and vertically sandwiched by two adjacent disks 180. Heads on two opposite head suspension assemblies can be unloaded/loaded onto via lifting arms. Each disks 180 in the stack of disks is sandwiched or clamped by one set of two disk spacers 140 back-to-back, including the ones at top and bottom of the drive so that all heads in the head stack assembly can be loaded or unloaded simultaneously.

As for presently preferred details regarding materials and dimensions, a hard disk drive employing disks made from glass substrates preferably employs spacer structure made from ceramic whereas disks made from aluminum substrates preferably employs spacer structure made from aluminum. An aluminum spacer can be made for example by stamping, polishing, and coating steps in an economical process. More particularly, the spacer ramp surface is polished, coated with resisting coatings like DLC or other hard coatings, then lubricated with liquid lube like fluorocarbon similar to disk lube. As for the head gimbal assembly, the lift tab is part of the suspension, made of the same material such as stainless steel; the protuberance is polished and coated with wear resisting coatings like DLC or similar hard coatings.

Figure 7:
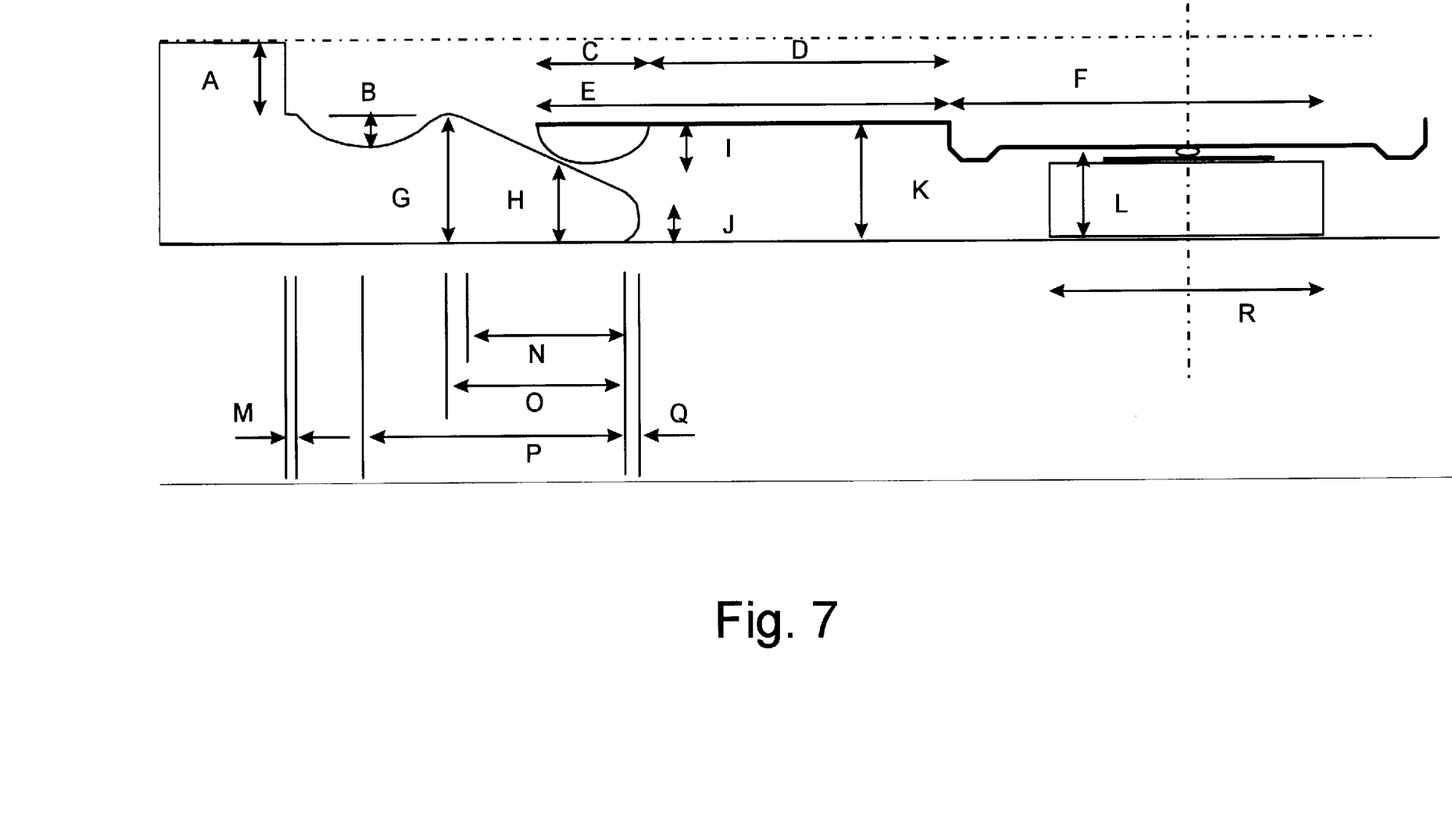
FIG. 7 is a side view of labeled structure with the labels providing an identification of items for which presently preferred dimensions are provide in a table herein.

With reference to FIG. 7, the following table sets forth presently preferred dimensions for the features A through R identified in FIG. 7:

| A | 15.5 mil | H | 12.5 mil | O | 47.5 mil |
|---|---|---|---|---|---|
| B | 8 mil | I | 10 mil | P | 59 mil |
| C | 15 mil | J | 7.5 mil | Q | 3 mil |
| D | 70 mil | K | 20 mil | R | 39 mil |
| E | 85 mil | L | 15 mil | | |
| F | 45 mil | M | 5 mil | | |
| G | 25 mil | N | 45 mil | | |

As for the slope of the sloped section 150, in a presently preferred embodiment it has a 21° slope. As for the relative dimensions of the depth of the protuberance and the depth of the recess, the dimensions presently preferred are 10 mil for the protuberance and 8 mil for the recess.

As for the procedure for unloading the head stack, it is presently preferred for the head-position control means to provide for the following. From dwell mode, when the spin motor starts to spin up, the protuberance begins to slide on the recess of the spacer; the protuberance tip and the recess surface are separated once a sufficient airbearing force is developed as the spacer ramp spins up; before the motor does not reach its full rpm, the suspension is actuated outwards and the protuberance fly slides over the top of the ramp and downward along the slope; at a desired speed, either at full rpm or lower, the gramload is developed onto the load beam and the slider ABS approaches the disk surface so that airbearing force is developed between the head ABS and the disk surface. A reverse sequence applies to the unload process during which protuberance is driven onto the slope, over the top and into the recess while the motor slows down from its full rpm till stop.

There are numerous advantages that arise from an embodiment of the invention. These advantages include but are not limited to: 1) with any OD ramp load/unload system, it is nearly impossible to add shrouding at the upstream of the disk array where HSA merges with and are loaded/unloaded onto the disks for windage and motor powder reduction; 2) an ID ramp only occupies the inner diameter section of the disk surface being used for CSS and not as valuable to magnetic real estate as what OD ramp would use instead.

We claim:

1. A disk drive comprising:
a disk having a disk spin axis and recording surface for storing data;
a head for reading data from the recording surface;
a spindle motor having a rotor;
clamping means for clamping the disk so that the disk spins with the rotor;
ramp-loading means;
multiple-function spacer means forming part of the clamping means and forming part of the ramp-loading means;
a head gimbal assembly including a flexure, a load beam having a central axis and a lift tab extending from the load beam, the flexure defining a cutout into which a tang projects, the tang having a first and a second side, the lift tab including a surface that defines a protuberance projecting away from the lift tab toward the recording surface such that the protuberance defines a protuberance depth,
the spacer means having a spacer spin axis and an axially-symmetrical surface, the spacer spin axis being aligned with the disk spin axis and the axially-symmetrical surface facing away from the recording surface;
the axially-symmetrical surface defining, in radial cross section, a sloped section and a recessed section adjoining the sloped section, the recessed section defining a recess depth, the recess depth not exceeding the protuberance depth;
a single sided limiter that projects away from a major plane of the load beam and cooperates with the first side of the tang to provide a stop that provides a counter balancing torsion when a lifting force is applied at the protuberance; and
head-position control means for controlling a parking operation carried out while the disk and the spacer means are spinning and in which the protuberance rises adjacent the sloped section and comes to rest in the recessed section.

2. The disk drive of claim 1, and including a wear-resistant coating layer covering a portion of the axially-symmetric surface, such as diamond-like carbon coating and then with a layer of lubricant, after being polished and treated mechanically and/or chemically.

3. The disk drive of claim 1, wherein the protuberance is coated with a wear resisting coating such as diamond-like carbon coating and then with a layer of lubricant, after being polished and treated mechanically and/or chemically.

4. The disk drive of claim 1, wherein the head is bonded to the tang to define an acute angle relative to the central axis of the load beam so that the head retains a small skew angle relative to a circumference of the disk when the head moves into a loading zone at an inner diameter of the disk.

5. The disk drive of claim 1, wherein the spacer means comprises an integral structure having parallel spaced-apart surfaces that are under compression within the clamping means.

6. The disk drive of claim 1, wherein the spacer means comprises a multi-piece structure compressed between a pair of disks, the multi-piece structure including a ring having bearing surfaces and a pair of elements having contoured surfaces.

7. The disk drive of claim 1, wherein the protuberance has a generally half spherical shape.

8. A disk drive comprising:
a disk having a disk spin axis and recording surface for storing data;
a head for reading data from the recording surface;
a spindle motor having a rotor;
clamping means for clamping the disk so that the disk spins with the rotor;
ramp-loading means;
multiple-function spacer means forming part of the clamping means and forming part of the ramp-loading means;
a head gimbal assembly including a flexure, a load beam having a central axis and a lift tab extending from the load beam, the load beam comprising a dimple on a distal end thereof, the flexure defining a cutout into which a tang projects, the head being affixed to the tang, the lift tab including a surface that defines a protuberance projecting away from the lift tab toward the recording surface such that the protuberance defines a protuberance depth,
the spacer means having a spacer spin axis and an axially-symmetrical surface, the spacer spin axis being aligned with the disk spin axis and the axially-symmetrical surface facing away from the recording surface;

the axially-symmetrical surface defining, in radial cross section, a sloped section and a recessed section adjoining the sloped section, the recessed section defining a recess depth, the recess depth not exceeding the protuberance depth;

a single sided limiter, the single sided limiter being configured to limit an uplift bending of the first side of the tang when the head is pulled away from the dimple; and head-position control means for controlling a parking operation carried out while the disk and the spacer means are spinning and in which the protuberance rises adjacent the sloped section and comes to rest in the recessed section.

9. The disk drive of claim 8, and including a wear-resistant coating layer covering a portion of the axially-symmetric surface, such as diamond-like carbon coating and then with a layer of lubricant, after being polished and treated mechanically and/or chemically.

10. The disk drive of claim 8, wherein the protuberance is coated with a wear resisting coating such as diamond-like carbon coating and then with a layer of lubricant, after being polished and treated mechanically and/or chemically.

11. The disk drive of claim 8, wherein the head is bonded to the tang to define an acute angle relative to the central axis of the load beam so that the head retains a small skew angle relative to a circumference of the disk when the head moves into a loading zone at an inner diameter of the disk.

12. The disk drive of claim 8, wherein the spacer means comprises an integral structure having parallel spaced-apart surfaces that are under compression within the clamping means.

13. The disk drive of claim 8, wherein the spacer means comprises a multi-piece structure compressed between a pair of disks, the multi-piece structure including a ring having bearing surfaces and a pair of elements having contoured surfaces.

14. The disk drive of claim 8, wherein the protuberance has a generally half spherical shape.

* * * * *